United States Patent
García Nieto et al.

(10) Patent No.: US 10,843,785 B2
(45) Date of Patent: Nov. 24, 2020

(54) PRESSURE BULKHEAD

(71) Applicant: AIRBUS OPERATIONS S.L., Getafe (ES)

(72) Inventors: Carlos García Nieto, Getafe (ES); Francisco José Cruz Domínguez, Getafe (ES); Juan Pablo Juste Mencía, Getafe (ES); Nuria Colmenarejo Matellano, Getafe (ES); Alejandro Martínez Cañizares, Getafe (ES)

(73) Assignee: Airbus Operations S.L., Getafe (ES)

( * ) Notice: Subject to any disclaimer, the term of this patent is extended or adjusted under 35 U.S.C. 154(b) by 406 days.

(21) Appl. No.: 15/381,747

(22) Filed: Dec. 16, 2016

(65) Prior Publication Data
US 2017/0174308 A1    Jun. 22, 2017

(30) Foreign Application Priority Data
Dec. 18, 2015 (EP) .................................. 15382647

(51) Int. Cl.
*B64C 1/10* (2006.01)
*B64C 1/06* (2006.01)

(52) U.S. Cl.
CPC ............... *B64C 1/10* (2013.01); *B64C 1/064* (2013.01)

(58) Field of Classification Search
CPC .. B64C 1/10; B64C 1/064; B64C 1/06; B64C 1/12
See application file for complete search history.

(56) References Cited

U.S. PATENT DOCUMENTS

| | | | | |
|---|---|---|---|---|
| 1,808,842 A | * | 6/1931 | Fedor | B64C 3/00 244/123.12 |
| 1,942,149 A | * | 1/1934 | Ragsdale | B64C 1/068 244/119 |
| 2,407,059 A | * | 9/1946 | Crafton | E01C 9/083 404/35 |
| 2,813,692 A | * | 11/1957 | Peterson | H01B 17/306 174/152 R |
| 2,941,759 A | * | 6/1960 | Schwartz | B64D 13/006 244/117 A |

(Continued)

FOREIGN PATENT DOCUMENTS

| EP | 1533225 | 5/2005 |
|---|---|---|
| EP | 2098448 | 9/2009 |

(Continued)

OTHER PUBLICATIONS

European Search Report, dated Mar. 23, 2016, priority document.

*Primary Examiner* — Michael H Wang
(74) *Attorney, Agent, or Firm* — Greer, Burns & Crain, Ltd.

(57) ABSTRACT

A pressure bulkhead for an aircraft comprising a pressurized zone, the pressure bulkhead made of a composite material and comprising a front panel intended to be faced towards the pressurized zone; and a rear panel, substantially parallel to the front panel and intended to be located farther from the pressurized zone than the front panel. The pressure bulkhead further comprises a plurality of longerons located between the front panel and the rear panel, each one of them being attached to the front panel and to the rear panel; and a plurality of stiffeners, some of them being attached to the front panel and a remainder of them being attached to the rear panel.

7 Claims, 3 Drawing Sheets

(56) References Cited

U.S. PATENT DOCUMENTS

| | | | | |
|---|---|---|---|---|
| 3,126,718 | A * | 3/1964 | Flamand | B64C 1/40 62/219 |
| 3,243,150 | A * | 3/1966 | Woodcock | B64D 37/06 114/74 R |
| 4,739,823 | A * | 4/1988 | Howard | B64D 13/00 165/104.34 |
| 4,957,250 | A * | 9/1990 | Hararat-Tehrani | B60R 21/026 244/118.1 |
| 5,085,382 | A * | 2/1992 | Finkenbeiner | B64C 1/10 188/371 |
| 5,086,723 | A * | 2/1992 | Goldbach | B63B 3/62 114/78 |
| 5,165,627 | A * | 11/1992 | Amano | B64C 1/40 244/119 |
| 5,217,184 | A * | 6/1993 | Hararat-Tehrani | B64C 1/10 244/118.1 |
| 5,727,492 | A * | 3/1998 | Cuneo | B63B 25/16 114/74 A |
| 6,010,286 | A * | 1/2000 | Cross | B64D 9/00 244/118.1 |
| 7,258,303 | B2 * | 8/2007 | Bouchet | B64C 1/10 244/118.1 |
| 8,444,089 | B2 * | 5/2013 | Mischereit | B64C 1/10 244/118.5 |
| 2005/0116102 | A1 * | 6/2005 | Bouchet | B64C 1/10 244/118.5 |
| 2005/0279887 | A1 | 12/2005 | Bouchet et al. | |
| 2007/0022707 | A1 * | 2/2007 | Gregg | B29C 66/721 52/837 |
| 2007/0277470 | A1 * | 12/2007 | Vichniakov | B64C 1/12 52/588.1 |
| 2015/0008284 | A1 * | 1/2015 | Thomas | B64C 1/06 244/119 |
| 2016/0244142 | A1 * | 8/2016 | Martino Gonzalez | B64C 1/10 |

FOREIGN PATENT DOCUMENTS

| | | | |
|---|---|---|---|
| EP | 2824031 | 1/2015 | |
| FR | 2653090 | 4/1991 | |
| GB | 395194 A * | 7/1933 | B64C 1/064 |
| WO | 2013032369 | 3/2013 | |

\* cited by examiner

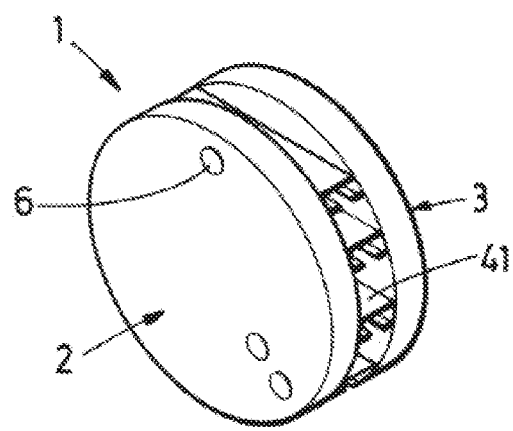
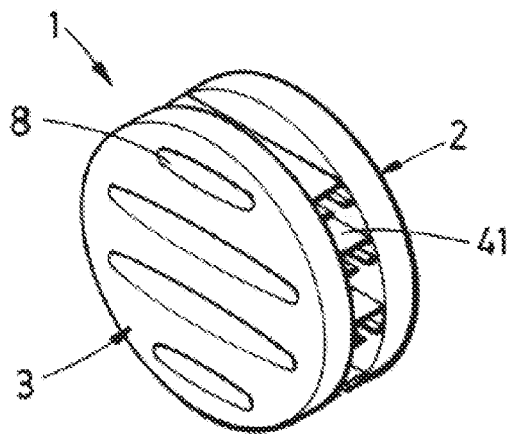
FIG.1  FIG.2
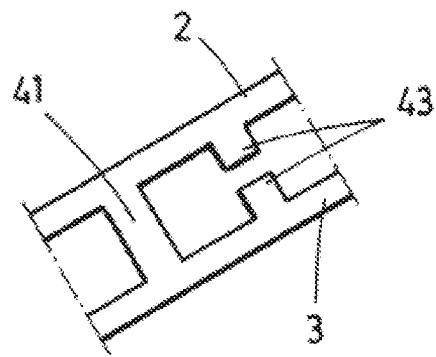
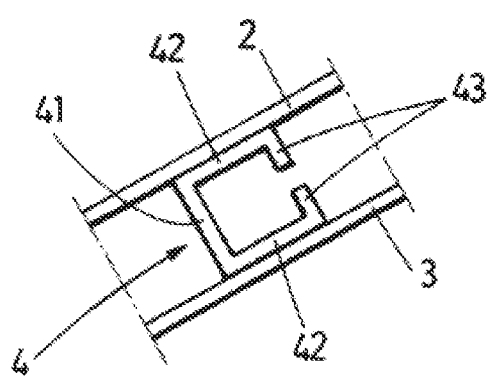
FIG.3a  FIG.3b

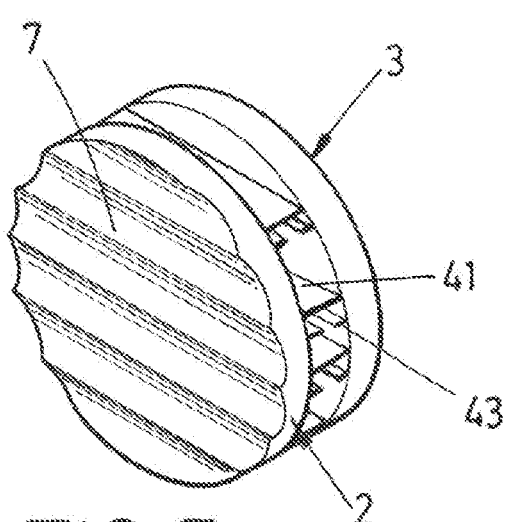
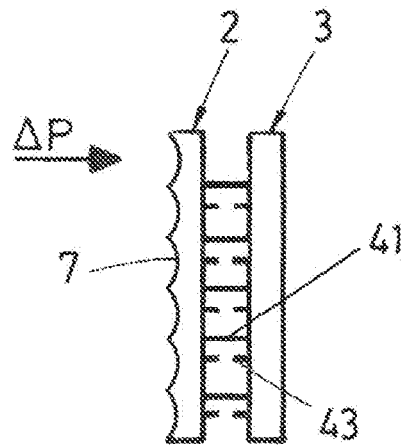
FIG.5a  FIG.5b
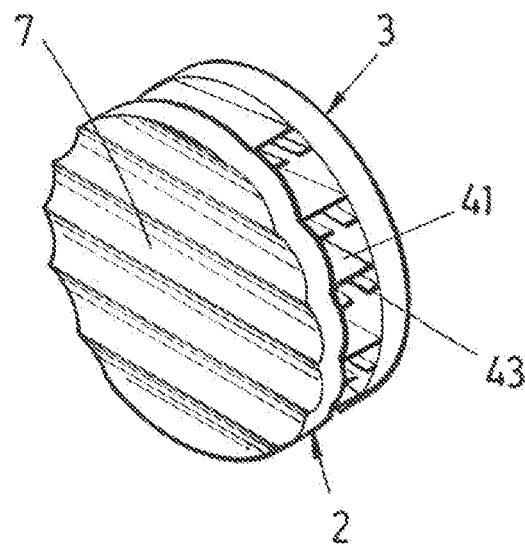
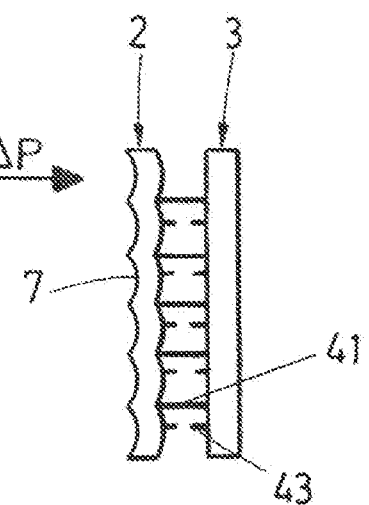
FIG.6a  FIG.6b

PRESSURE BULKHEAD

CROSS-REFERENCES TO RELATED APPLICATIONS

This application claims the benefit of the European patent application No. 15382647.4 filed on Dec. 18, 2015, the entire disclosures of which are incorporated herein by way of reference.

TECHNICAL FIELD OF THE INVENTION

The present invention is related to the field of aircraft parts, in particular, to the field of pressure bulkheads.

BACKGROUND OF THE INVENTION

The pressurized zone of an aircraft is demarcated by the central part of the fuselage and two pressure bulkheads. These elements are intended to support the pressure difference between the pressurized zone and the non-pressurized zone, ensuring correct air tightness without significantly varying the volume defined by them.

Additionally, pressure bulkheads must comply not only with mechanical requirements, but also with operational requirements: these elements must be able to bear pressure differences in both directions without collapsing, and they must fulfil basic aeronautical requirements (e.g., safety) and premises (weight, space allocation requirements, i.e., not using up more space than necessary and optimizing space for payload and aircraft systems).

There are different structural concepts that solve the above mentioned pressure bulkhead requirements. A common solution is the dome pressure bulkhead, which is described in many patents, such as U.S. Pat. No. 5,062,589 A or US 2015/144736 A1.

SUMMARY OF THE INVENTION

The present invention provides the pressure bulkhead as an alternative solution to the aforementioned problem. All the features described in this specification, including the claims, description and drawings, can be combined in any way, except for the cases of mutually exclusive features. The dependent claims define preferred embodiments of the invention.

According to a first aspect, the invention provides a pressure bulkhead for an aircraft comprising a pressurized zone and a non-pressurized zone, the pressure bulkhead made of a composite material and comprising a front panel comprising two sides, one of them intended to be faced towards the pressurized zone;

a rear panel, which is substantially parallel to the front panel, the rear panel comprising two sides, one of them intended to be faced towards the non-pressurized zone;

a plurality of longerons located between the front panel and the rear panel, each one of them being attached to the front panel and to the rear panel; and a plurality of stiffeners some of them being attached to the front panel and the rest of them being attached to the rear panel.

This pressure bulkhead fulfils weight requirements and challenges significantly cost figures.

In a particular embodiment, the pressure bulkhead further comprises a plurality of stiffening elements, each one comprising in turn one longeron, located between the front panel and the rear panel and attached to the front panel and to the rear panel;

one stiffener attached to the front panel;

one stiffener attached to the rear panel; and two flanges, one of them being arranged on the front panel and attaching the longeron to the stiffeners attached to the front panel and the other one being arranged on the rear panel and attaching the longeron to the other stiffener.

In a particular embodiment, the front panel or the rear panel comprises so-called openings, these openings being suitable for allowing system elements going through said panel. System elements should be understood as cables, wires or tubes.

In a particular embodiment, the front panel or the rear panel comprise holes. These holes are very useful for several reasons. The first one is that they reduce the weight of the pressure bulkhead. The second one is that they allow the installation of the pressure bulkhead in an aircraft. The last one is that they provide for a manhole to carry out maintenance work, once the pressure bulkhead has been installed in an aircraft.

In a particular embodiment, the front panel and the rear panel are substantially flat.

In a particular embodiment, at least one side of the front panel or the rear panel comprises a plurality of curved zones. These curved zones allow the pressure bulkhead to show a better behavior against the pressure loads coming from the pressurized zone of the aircraft. The curved zones are arranged in such a way that the surface is concave when seen from the pressurized zone. In a particular embodiment, the curved zones are arranged in a parallel way in both sides of the front panel or the rear panel.

In a particular embodiment, each curved zone is located between stiffening elements.

In a particular embodiment, each curved zone is located between a longeron and a stiffener.

In a particular embodiment, each curved zone is located between two longerons.

In a particular embodiment, the stiffening elements are arranged radially from an origin point. In other particular embodiment, the stiffening elements are arranged in a substantially parallel way with respect to each other. These ways of arranging the stiffening elements modify the mechanical behavior, so the optimal one may be chosen depending on the specific use of each pressure bulkhead.

In a particular embodiment, the stiffening elements are attached to the front panel and the rear panel by a one shot manufacturing process. This feature reduces the problems related with the combination of curing and bonding cured pieces and provides for a concept of pressure bulkhead that can be installed as one complete structural component in the fuselage.

BRIEF DESCRIPTION OF THE DRAWINGS

These and other characteristics and advantages of the invention will be clearly understood in view of the detailed description of the invention and further in view of the preferred embodiments of the invention, with reference to the drawings. Preferred embodiments are given just as examples and are not intended to limit the scope of the present invention.

FIG. 1 shows a front perspective view of a first embodiment of a pressure bulkhead according to the invention.

FIG. 2 shows a rear perspective view of the first embodiment of a pressure bulkhead according to the invention.

FIG. 3a shows a detail of the longerons and stiffeners of the pressure bulkhead.

FIG. 3b shows a detail of the stiffening elements of the pressure bulkhead.

FIGS. 5a-5b show a particular embodiment of a pressure bulkhead.

FIGS. 6a-6b show a particular embodiment of a pressure bulkhead.

DETAILED DESCRIPTION OF THE PREFERRED EMBODIMENTS

Figure 4A:
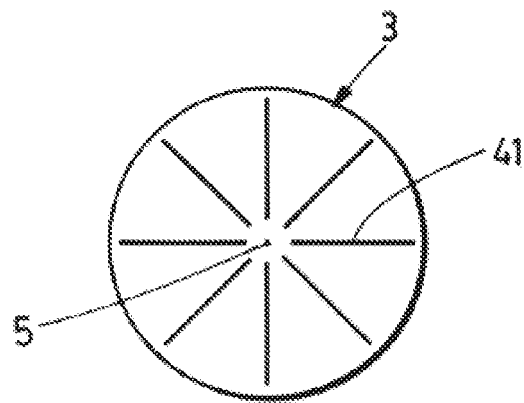
FIGS. 4a-4c show different embodiments of pressure bulkheads according to the invention, where the front panel has been removed, to show three different possibilities of the arrangement of the stiffening elements.

Having outlined the object of the invention, specific non-limitative embodiments are described hereinafter.

FIG. 1 shows a front view of a first embodiment of a pressure bulkhead (1) according to the invention. This pressure bulkhead is intended to be located in an aircraft, to separate the pressurized zone of the aircraft from the non-pressurized zone. This pressure bulkhead (1) is made of a composite material and comprises:

- a front panel (2), which is intended to be faced towards the pressurized zone;
- a rear panel (3), which is substantially parallel to the front panel (2) and is intended to be faced towards the non-pressurized zone,
- a plurality of longerons (41) located between the front panel (2) and the rear panel (3), each one of them being attached to the front panel (2) and to the rear panel (3); and
- a plurality of stiffeners (43) some of them being attached to the front panel (2) and the rest of them being attached to the rear panel (3).

In this figure, the front panel (2) comprises openings (6), which are useful for system elements to pass through the panels (2, 3) of the pressure bulkhead.

FIG. 2 shows a rear view of the pressure bulkhead (1) according to the first invention, wherein the rear panel (3) comprises holes (8) to reduce weight, which may be performed during the manufacturing of this rear panel (3) or in a later stage.

FIG. 3a shows a detailed view of the pressure bulkhead (1) of FIG. 1 wherein the longerons (41) are located between the front panel (2) and the rear panel (3) attached each one to the front panel (2) and to the rear panel (3) and the plurality of stiffeners (43) are attached some to the front panel (2) and others to rear panel (3). Each longeron (41) is arranged in a substantially perpendicular way with respect to the front panel (2) and rear panel (3), which are substantially parallel to each other.

FIG. 3b shows an embodiment in which a plurality of stiffening elements (4) are located between the front panel (2) and the rear panel (3), each stiffening element (4) being attached to both panels (2, 3). Each stiffening element (4) comprises a longeron (41), two flanges (42) and two stiffeners (43). The flanges (42) attach the longeron (41) to the stiffeners (43) thus achieving a stiffening element (4) located between the front panel (2) and the rear panel (3).

The flanges (42) are arranged parallel to the front panel (2) and rear panel (3), as one of the flanges is laid on the front panel (2) and the other one is laid on the rear panel (3). The stiffeners (43) are arranged parallel to the longeron (41) one attached to the flange laid on the front panel (2) and the other attached to the flange laid on the rear panel (3). The aim of arranging these stiffeners (43) is to improve stability issues. As there are several stiffening elements (4) arranged in series, the mechanical behavior is improved.

Figure 4B:
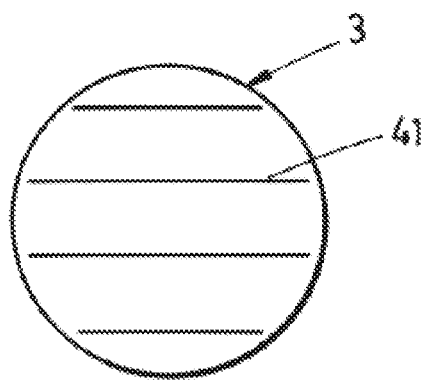
Figure 4C:
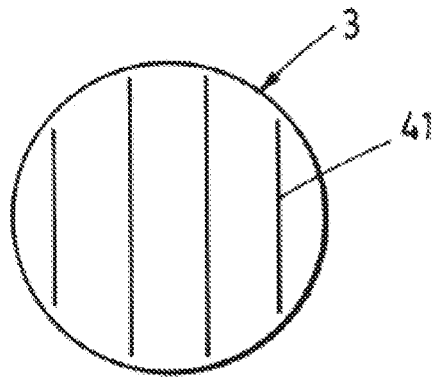

FIGS. 4a to 4c show different embodiments of pressure bulkheads (1) according to the invention, where the front panel has been removed, to show three different possibilities of the arrangement of the longerons (41). FIG. 4a shows a pressure bulkhead (1) where the longerons (41) are arranged radially from an origin point (5). The longerons (41) do not start in this origin point (5), although in different embodiments they start in this origin point (5), but their directions are oriented substantially from said point. FIG. 4b shows a pressure bulkhead (1) where the longerons (41) are arranged in a substantially parallel way with respect to each other, but in a direction from the left part of said fuselage to the right one. FIG. 4c shows a pressure bulkhead (1) where the longerons (41) are arranged in a substantially parallel way with respect to each other, in a direction from the top part of the fuselage of the aircraft where the pressure bulkhead (1) is installed to the lower one.

All these embodiments show substantially flat panels (2, 3), in order to increase the cabin space of the aircraft.

FIGS. 5a and 5b show a particular embodiment of a pressure bulkhead (1), wherein the front panel (2) comprises curved zones (7). The front panel (2) of the pressure bulkhead (1) comprises two sides, one side intended to be faced to the pressurized zone of the aircraft and the other one faced to the rear panel (3), and these curved zones (7) are arranged in the side of the front panel (2) which is intended to be faced to the pressurized zone of the aircraft. These curved zones (7) allow the pressure bulkhead to show a better behavior against the pressure loads coming from the pressurized zone of the aircraft.

FIG. 5a shows how the curved zones (7) are arranged in a parallel way throughout the front panel (2). Other arrangements of these curved zones (7) are possible in different embodiments.

FIG. 5b shows a side view of the pressure bulkhead (1) of FIG. 5a. The curved zones (7) are arranged in such a way that the surface of the curved zones (7) is concave when seen from the pressurized zone.

FIGS. 6a and 6b show a particular embodiment of a pressure bulkhead (1), wherein the front panel (2) comprises curved zones (7). The front panel (2) of the pressure bulkhead (1) comprises two sides, one of them intended to be faced towards the pressurized zone of the aircraft and the other one faced towards the rear panel (3). In this figure, both sides of the front panel (2) comprises a plurality of curved zones (7) arranged in a parallel way, wherein each curved zone (7) are located between two consecutive longerons (41).

FIG. 6a shows how the curved zones (7) are arranged in a parallel way throughout the front panel (2). Other arrangements of these curved zones (7) are possible in different embodiments.

FIG. 6b shows a side view of the pressure bulkhead (1). The curved zones (7) are arranged in such a way that both sides of the front panel comprise surfaces which are concave when seen from the pressurized zone.

These side views of the pressure bulkhead (1) illustrate how the fact that the pressure bulkhead comprises curved zones (7) is compatible with the fact that the front and/or rear panels are substantially flat. This is because the disturbance of each curved zone (7) does not alter the substantially flat shape of the side view of each panel, since "flat" should not be understood as "smooth," but should be understood as "not globally curved," opposite to, e.g., the known dome-shaped pressure bulkheads, the shape of which is "globally curved."

In some embodiments, the stiffening elements (4) are attached to the front panel (2) and the rear panel (3) by a one-shot manufacturing process. This provides a better mechanical behavior.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A pressure bulkhead for an aircraft comprising a pressurized zone and a non-pressurized zone, the pressure bulkhead made of a composite material and comprising:
    a flat front panel comprising two sides, one of the sides intended to be faced towards the pressurized zone;
    a flat rear panel, which is substantially parallel to the front panel, the rear panel comprising two sides, one of the sides intended to be faced towards the non-pressurized zone,
    wherein both sides of the front panel comprises a plurality of curved zones, the plurality of curved zones on both sides being arranged in a parallel way, such that the plurality of curved zones on both sides are identical and spaced apart, each curved zone consisting of two terminal points connected by a parabolic curve extending between to the two terminal points such that the parabolic curve is concave when seen from the pressurized zone, and wherein a first terminal point of a first curved zone comprises a first terminal point of a second curved zone,
    a plurality of stiffening elements, each stiffening element comprising:
        a longeron from a plurality of longerons located between the front panel and the rear panel, each longeron being attached to the front panel and to the rear panel; and
        two stiffeners from a plurality of stiffeners, one of the stiffeners being attached only to the front panel and the other of the stiffeners being attached only to the rear panel, and
        wherein the two stiffeners of each stiffening element are located on a same side of the longeron of the stiffening element; and
        wherein the terminal points on the curved zones for both sides of the front panel are collinear on a line perpendicular to the rear panel and each of the terminal points of both curved zones are collinear with one of the longerons from the plurality of longerons.

2. The pressure bulkhead according to claim 1, wherein one of the front panel or the rear panel comprises openings suitable for allowing system elements to go through said panel.

3. The pressure bulkhead according to claim 1, wherein one of the front panel or the rear panel comprises holes.

4. The pressure bulkhead according to claim 1, wherein each curved zone is located between two longerons.

5. The pressure bulkhead according to claim 1, wherein the longerons are arranged radially from an origin point.

6. The pressure bulkhead according to claim 1, wherein the longerons are arranged in a substantially parallel way with respect to each other.

7. A pressure bulkhead for an aircraft comprising a pressurized zone and a non-pressurized zone, the pressure bulkhead made of a composite material and comprising
    a flat front panel comprising two sides, one of the sides configured to face towards the pressurized zone;
    a flat rear panel, substantially parallel to the front panel, the rear panel comprising two sides, one of the two sides configured to face towards the non-pressurized zone,
    wherein both sides of the front panel comprise. a plurality of curved zones, the plurality of curved zones on both sides are arranged in a parallel way, such that the plurality of curved zones on both sides are identical and spaced apart, each curved zone consisting of two terminal points connected by a parabolic curve extending between to the two terminal points such that the parabolic curve is concave when seen from the pressurized zone, wherein a first terminal point of a first curved zone comprises a first terminal point of a second curved zone,
    a plurality of longerons extending between the front panel and the rear panel, each longeron attached to the front panel and to the rear panel; and
    a plurality of stiffeners, the stiffeners from the plurality of the stiffeners arranged in pairs such that one of the stiffeners of each pair is attached only to the front panel and the other of the stiffeners of each pair is attached only to the rear panel,
    wherein the longerons and the stiffeners are parallel, and
    wherein the longerons and the stiffeners alternate such that a longeron from the plurality of longerons is between two pairs of stiffeners from the plurality of stiffeners, and wherein a pair of stiffeners from the plurality of stiffeners is between two longerons from the plurality of longerons; and
    wherein the terminal points on the curved zones for both sides of the front panel are collinear on a line perpendicular to the rear panel and each of the terminal points of both curved zones are collinear with one of the longerons from the plurality of longerons.

* * * * *